(12) United States Patent
Chu et al.

(10) Patent No.: US 12,495,400 B2
(45) Date of Patent: Dec. 9, 2025

(54) NULL DATA PACKET ANNOUNCEMENT FOR SENSING

(71) Applicant: NXP USA, INC., Austin, TX (US)

(72) Inventors: Liwen Chu, San Ramon, CA (US);
Dong Wei, Austin, TX (US);
Hongyuan Zhang, Fremont, CA (US);
Christian Raimund Berger, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 427 days.

(21) Appl. No.: 18/064,653

(22) Filed: Dec. 12, 2022

(65) Prior Publication Data
US 2023/0189223 A1    Jun. 15, 2023

Related U.S. Application Data

(60) Provisional application No. 63/265,362, filed on Dec. 14, 2021.

(51) Int. Cl.
*H04W 72/0446* (2023.01)
*H04L 5/00* (2006.01)
*H04W 24/10* (2009.01)

(52) U.S. Cl.
CPC ....... *H04W 72/0446* (2013.01); *H04L 5/0048* (2013.01); *H04W 24/10* (2013.01)

(58) Field of Classification Search
CPC .............. H04W 72/0446; H04W 24/10; H04L 5/0048; H04L 5/005; H04L 5/0057
USPC ........................................................ 370/329
See application file for complete search history.

(56) References Cited

U.S. PATENT DOCUMENTS

2020/0132857 A1*  4/2020  Berger ................ H04W 64/003

OTHER PUBLICATIONS

Satyanarayana et al., "Sensing-specfic feedback using NDPA and trigger frames", InterDigital, Sep. 15, 2021. (From Applicant's IDS) (Year: 2021).*
Dobgguk Lim et al., "Consideration for NDPA in 11BF", LG, Nov. 15, 2021. (From Applicant's IDS) (Year: 2021).*
Satynarayana Katla et al.; "Sensing-Specific Feedback Using NDPA and Trigger Frames"; Interdigital; Sep. 15, 2021.
Dongguk Lim et al.; "Consideration for NDPA in 11BF"; Interdigital; Nov. 15, 2021.
Junghoon Suh et al., "NDPA for Sensing"; Interdigital; Nov. 15, 2021.
P802.11az™/D4.0, Working Group of LAN/WAN Standard Committee of the IEEE; "Draft Standard for Information Technology—Telecommunications and Information Exchange Between Systems Local and Metropolitan Area Networks—Specific Requirements . . . "; The Institute of Eletrical and Electronics Engineers, Inc.; New York, New York; Aug. 2021.

(Continued)

*Primary Examiner* — Mang Hang Yeung

(57) ABSTRACT

Various embodiments relate to a first wireless device configured to establish sensing with a second wireless device, including: a transmitter configured to: transmit a null data packet announcement (NDPA) frame to the second wireless device configured to include an indication that the NDPA frame is a sensing NDPA frame; transmit a null data packet (NDP) frame to the second wireless device; a receiver configured to: receive a frame from the second wireless device indicating sensing information.

16 Claims, 10 Drawing Sheets

(56) References Cited

OTHER PUBLICATIONS

IEEE P802.11be™M/D1.3, Working Group of LAN/WAN Standard Committee of the IEEE; "Draft Standard for Information Technology—Telecommunications and Information Exchange Between Systems Local and Metropolitan Area Networks—Specific Requirements . . . "; The Institute of Eletrical and Electronics Engineers, Inc.; New York, New York; Nov. 2021.

\* cited by examiner

NDP ANNOUNCEMENT FRAME VARIANT ENCODING

| NDP ANNOUNCEMENT VARIANT SUBFIELD | | NDP ANNOUNCEMENT FRAME VARIANT |
|---|---|---|
| B1 | B0 | |
| 0 | 0 | VHT NDP ANNOUNCEMENT FRAME |
| 0 | 1 | RANGING NDP ANNOUNCEMENT FRAME |
| 1 | 0 | HE NDP ANNOUNCEMENT FRAME |
| 1 | 1 | EHT ANNOUNCEMENT FRAME |

FIG. 2D

NULL DATA PACKET ANNOUNCEMENT FOR SENSING

CROSS-REFERENCE TO RELATED APPLICATIONS

This application claims benefit to U.S. Provisional Patent Application No. 63/265,362 filed on Dec. 14, 2021, the contents of which are hereby incorporated by reference for all purposes as if fully set forth herein.

TECHNICAL FIELD

Various exemplary embodiments disclosed herein relate generally to apparatus and methods of null data packet (NDP) announcement for sensing.

BACKGROUND

NDP announcement frames are used in various versions of Wi-Fi for sounding and ranging where each type is indicated in a sounding dialog token field. Wi-Fi is also being used for sensing applications. Currently the 802.11bf specification uses NDP for sensing. This means that using NDP announcement frames for specifying sounding, ranging, and sensing requires finding a solution to allow this.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a first wireless device configured to establish sensing with a second wireless device, including: a transmitter configured to: transmit a null data packet announcement (NDPA) frame to the second wireless device configured to include an indication that the NDPA frame is a sensing NDPA frame; and transmit a null data packet (NDP) frame to the second wireless device; and a receiver configured to: receive a frame from the second wireless device containing sensing measurement results.

Various embodiments are described, wherein the NDPA frame indicates that it is a sensing NDPA frame based upon AID11 and Sensing subfields in a STA Info field of the NDPA frame.

Various embodiments are described, wherein the AID11 subfield having a specified value and the Sensing subfield being set to a predetermined value indicate that the NDPA frame is a sensing NDPA frame.

Various embodiments are described, wherein the frame received from the second wireless device is a measurement report frame.

Various embodiments are described, wherein the frame received from the second wireless device is a sensing responder to the NDP sent by the sensing initiator.

Various embodiments are described, wherein the NDPA frame indicates that it is a ranging NDPA frame or a sensing NDPA frame based upon an NDPA variant subfield of a sounding dialog token field of the NDPA frame.

Various embodiments are described, wherein the NDPA variant subfield has a value of 01.

Various embodiments are described, wherein a first reserved field and a second reserved field of a STA Info field of the NDPA frame indicates frame exchange sequence to be used between the first wireless device and the second wireless device.

Further various embodiments relate to a method of sensing measurement exchange between a first wireless device and a second wireless device, including: transmitting, by the first wireless device, a null data packet announcement (NDPA) frame to the second wireless device configured to include an indication that the NDPA frame is a sensing NDPA frame; transmitting, by the first wireless device, a null data packet (NDP) frame to the second wireless device; and receiving, by the first wireless device, a frame from the second wireless device containing sensing measurement results.

Various embodiments are described, wherein the NDPA frame indicates that it is a sensing NDPA frame based upon an AID11 subfield and a Sensing subfield in a STA Info field of the NDPA frame.

Various embodiments are described, wherein the AID11 subfield having a specified value and the Sensing subfield being set to a predetermined value indicates that the NDPA frame is a sensing NDPA frame.

Various embodiments are described, wherein the frame received from the second wireless device is a measurement report frame.

Various embodiments are described, wherein the frame received from the second wireless device is a responder to initiator NDP frame.

Various embodiments are described, wherein the NDPA frame indicates that it is a ranging NDPA frame or a sensing NDPA frame based upon an NDPA variant subfield of a sounding dialog token field of the NDPA frame.

Various embodiments are described, wherein the NDPA variant field has a value of 01.

Various embodiments are described, wherein a first reserved field and a second reserved field of a STA Info field of the NDPA frame indicates frame exchange sequence to be used between the first wireless device and the second wireless device.

BRIEF DESCRIPTION OF THE DRAWINGS

In order to better understand various exemplary embodiments, reference is made to the accompanying drawings, wherein:

FIG. 2D illustrates the NDPA frame variant encoding as indicated by the NDSP Announcement Variant field;

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. All changes which come within the meaning and range of equivalency of the claims are to be embraced within their scope.

Reference throughout this specification to features, advantages, or similar language does not imply that all of the features and advantages that may be realized by the invention should be or are in any single embodiment of the invention. Rather, language referring to the features and advantages is understood to mean that a specific feature, advantage, or characteristic described in connection with an embodiment is included in at least one embodiment of the invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Figure 1:
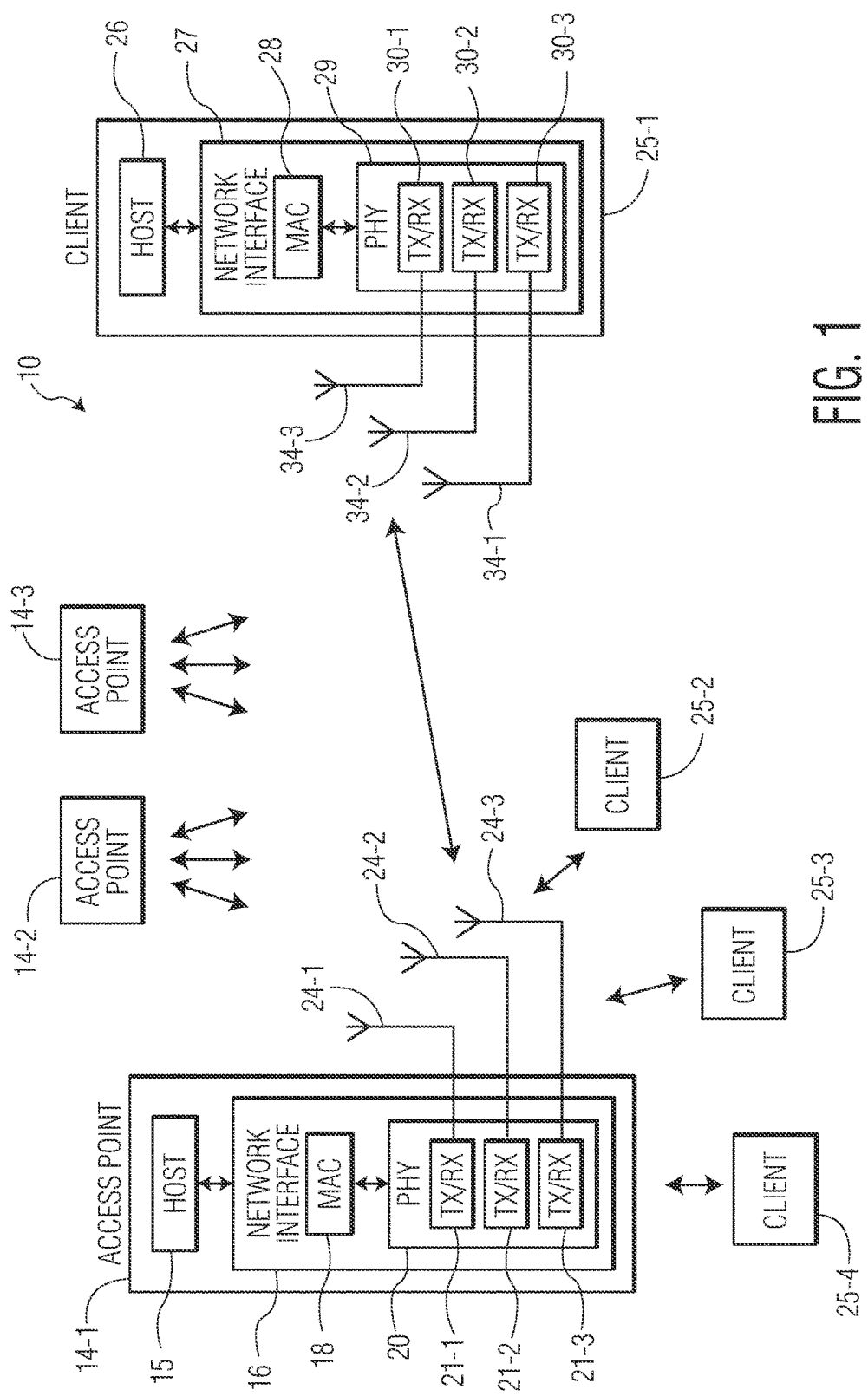
FIG. 1 is a block diagram of an example wireless local area network (WLAN), according to an embodiment.

FIG. 1 is a block diagram of an example wireless local area network (WLAN) 10, according to an embodiment. Such a WLAN 10 may need to be able to update operating parameters across a range of different versions of Wi-Fi or IEEE 802.11. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1, the WLAN 10 may include different numbers (e.g., 1, 2, 3, 5, 6, etc.) of client stations 25 in various scenarios and embodiments. The WLAN 10 may also include AP multi-link device (MLD) where one AP MLD includes multiple affiliated APs and client STA multi-link devices (MLD) where one non-AP MLD includes multiple affiliated STAs. Two or more of the STAs of a non-AP MLD 25 are configured to receive corresponding data streams that are transmitted simultaneously by the AP 14. Additionally, two or more of the STAs of a non-AP MLD 25 are configured to transmit corresponding data streams to one AP MLD 14 such that the AP MLD 14 simultaneously receives the data streams. Also, the client station MLD 25 are configured to receive data streams that are transmitted simultaneously by multiple APs of one AP MLD 14. Likewise, the STAs of a non-AP MLD 25 may transmit data streams simultaneously to the multiple APs of an AP MLD 14. MLD devices and operation will be described in more detail below.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different orthogonal frequency division multiplexing (OFDM) units to different client stations 25 by forming an orthogonal frequency division multiple access (OFDMA) resource unit (RU) that includes the different OFDM RUs modulated in respective sub-channel blocks of the OFDMA RU. In an embodiment, the AP 14 allocates different sub-channels to different client stations and forms the OFDMA RU that includes OFDM RUs directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM RUs via different space time streams of a MU-MIMO communication channel to a single user (SU) or multiple users. In an embodiment, the APs 14 allocates different sub-channels and space time streams to different client stations and forms the OFDM RUs and modulates the different OFDM RUs to the space time streams corresponding to the sub-channels assigned to the client stations.

Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). The terms VHT, HE, and EHT will be used in the descriptions found herein.

As described above a multi-link AP MLD has multiple links where each link has one AP affiliated with the AP MLD. This may be accomplished by having two different radios.

A multi-link STA MLD has one or multiple links where each link has one AP affiliated with the AP MLD. One way to implement the multi-link STA MLD is using two or more radios, where each radio is associated with a specific link. Another way to implement the multi-link STA MLD is using a single radio in two different bands. Each band may be associated with a specific link. In this case only one link is available at a time. In yet another implementation, an enhanced single-radio (ESR) STA MLD may be used. The ESR STA MLD uses two radios in different bands to implement the STA. For example, on radio may be a lower cost radio with lesser capabilities and the other radio may be a fully functional radio supporting the latest protocols. The ESR STA MLD may dynamically switch its working link while it can only transmit or receive through one link at any time. The ESR STA MLD may monitor two links simultaneously, for example, detecting medium idle/busy status of each link, or receiving a PPDU on each link. Each radio may have its own backoff time, and when the backoff counter for one of the radios becomes zero that radio and link may be used for transmission. For example, if an AP wants to use the fully functional radio, it may send a control frame that is long enough for the ESR STA MLD to switch from the lesser capable radio to the fully functional radio that may then transmit data to the AP.

In embodiments of a wireless communications system, a wireless device, e.g., an AP MLD of the WLAN may transmit data to at least one associated STA MLD. The AP MLD may be configured to operate with associated STA MLDs according to a communication protocol. For example, the communication protocol may be an Extremely High Throughput (EHT) communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a BSS with the AP, but are generally affiliated with lower data throughput protocols. The lower data throughput communication protocols (e.g., HE, VHT, etc.) may be collectively referred to herein as "legacy" communication protocols.

Figure 2A:
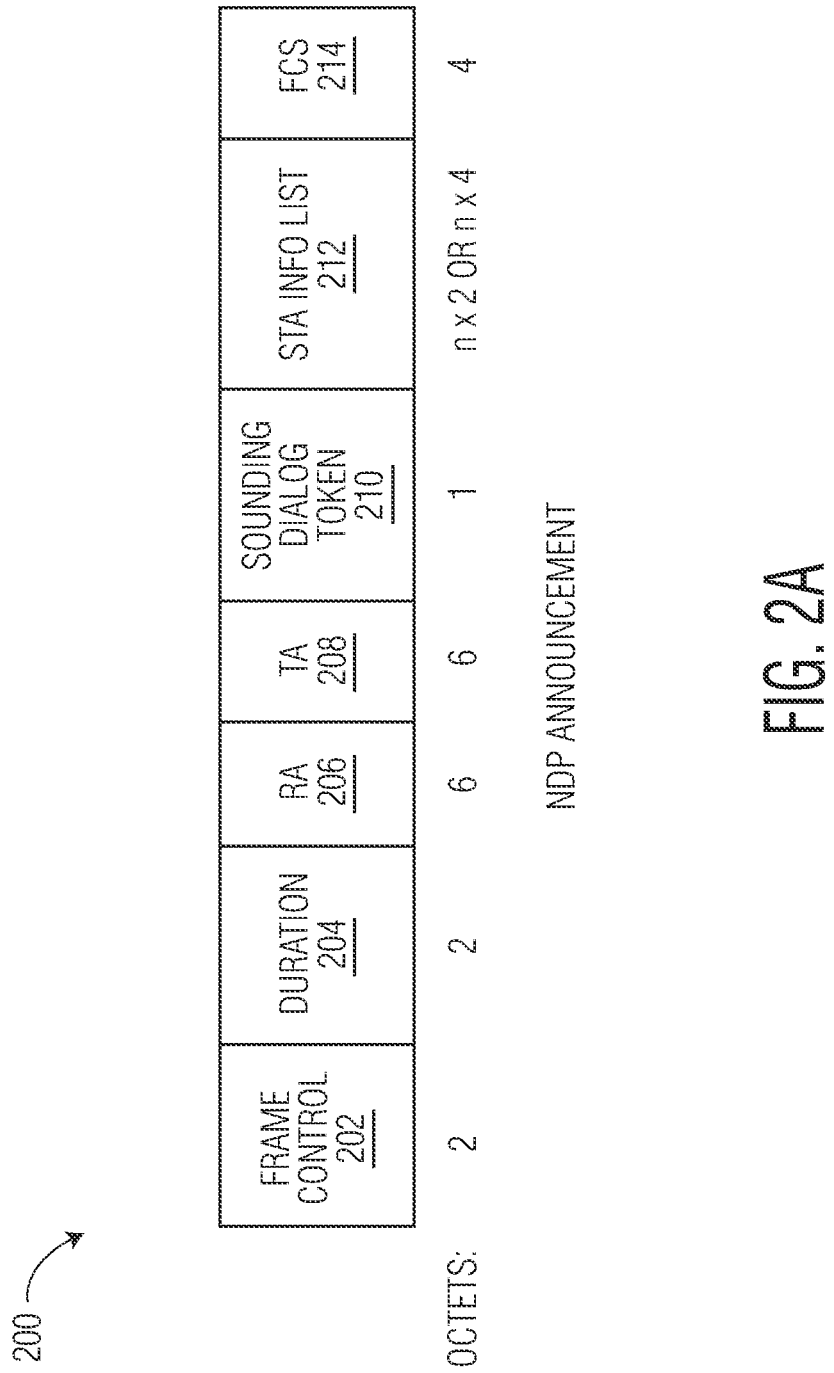
FIG. 2A illustrates the format of the NDPA frame.

A null data packet (NDP) may be used in sounding and ranging. For sounding, the NDP helps to determine the state of the communication channel. In ranging, range information may be determined by using NDPs. A NDP announcement (NDPA) frame may be used to announce that a NDP will be sent. The NDPA is used for VHT, HE, EHT, and 802.11az sounding/ranging where each type is indicated in a sounding dialog token field. In 802.11bf, a NDP is used for sensing. However, there is not a remaining value in the NDPA frame to indicate its use for sensing in the sensing application. Embodiments of how to specify the use of NDPA frame and NDP for use in sensing will be described herein. These embodiments may include the following features: reusing the 802.11az NDPA frame wherein some bits in the STA Info field are used to indicate whether the frame exchange sequence is used for sensing or ranging; and reusing the EHT NDPA frame wherein some bits in the STA Info field are used to indicate whether the frame exchange sequence is used for sensing or ranging. FIG. 2A illustrates the format of the NDPA frame. The NDPA frame 200 includes the following fields: frame control 202; duration 204; RA 206, TA; 208; Sounding Dialog Token 210; STA Info List 212; and FCS 214. The frame control field 202 provide information regarding the frame. The duration field 204 indicating the duration of the frame. The RA field 206 includes the receiver address, and the TA field 208 includes the transmitter address. The Sounding Dialog Token 210 provides information regarding sounding and will be described below. The STA Info List field 212 provides a list of stations addressed by the NDPA frame 200 and will be described further below. The FCS field 214 is the last field that defines the end of the frame.

Figure 2B:
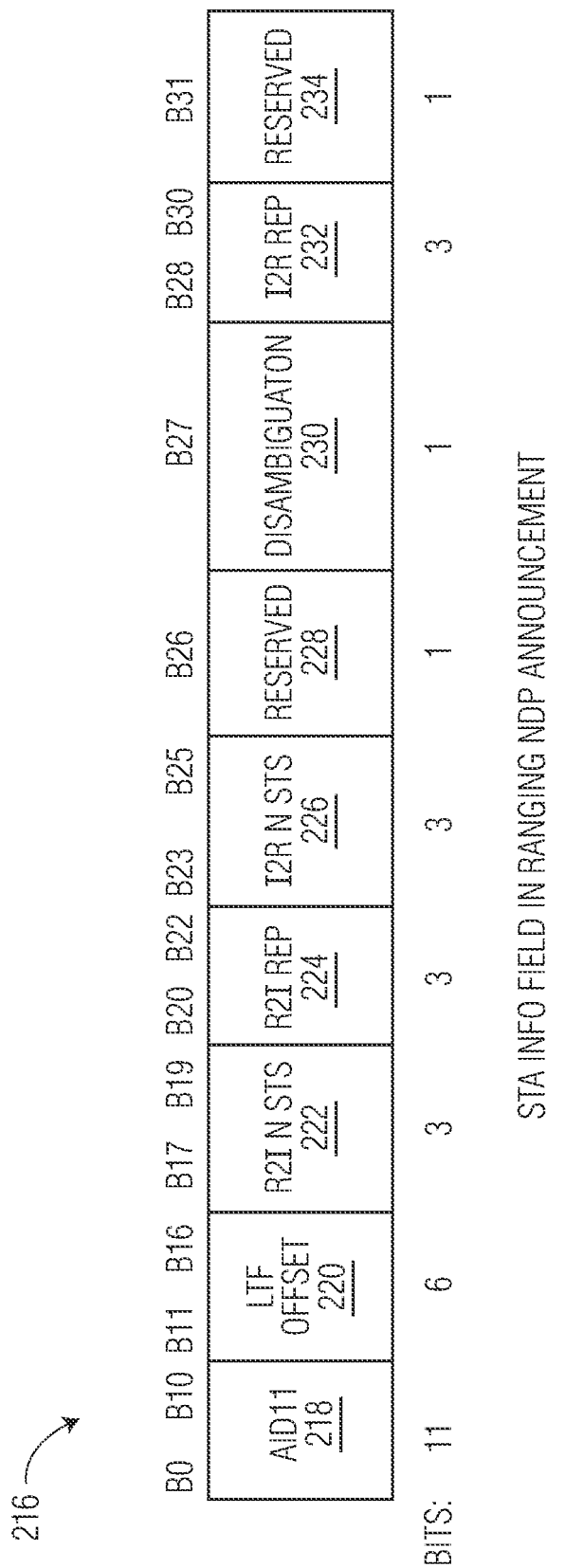
FIG. 2B illustrates the format of the STA Info Fields in a ranging NDPA frame.
Figure 2C:
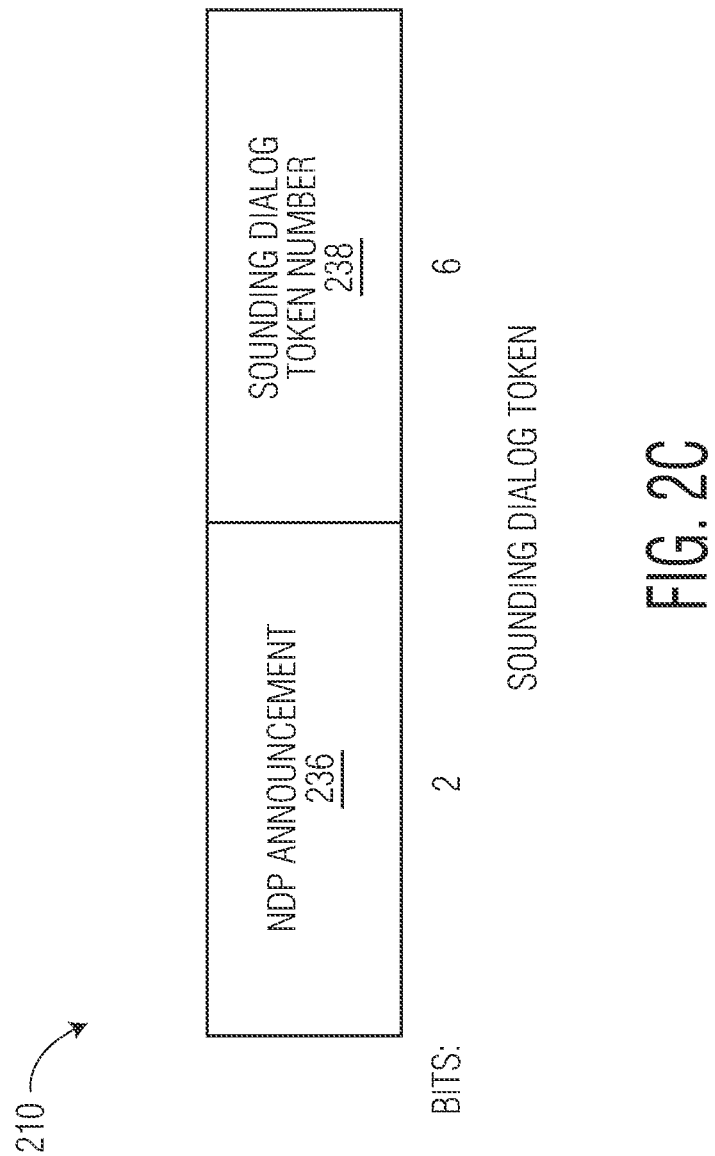
FIG. 2C illustrates the format of the Sounding Dialog Token fields.

FIG. 2B illustrates the format of the STA Info Fields in a ranging NDPA frame. The STA Info field 216 includes the following fields: AID11 218; LTE Offset; R2I_N_STA 222; R2I Rep 224; I2R_N_STS 226; reserved 228; Disambiguation 230; I2R Rep 232; and reserved 234. FIG. 2C illustrates the format of the Sounding Dialog Token fields 210. The Sounding Dialog Token field includes the NDP Announcement field 236 and the Sounding Dialog Token Number field 238. FIG. 2D illustrates the NDPA frame variant encoding as indicated by the NDSP Announcement Variant field 236.

Four types of NDPA frames are defined as indicated by the NDP Announcement Variant field 236 and as illustrated in FIG. 2D where 00 indicates a VHT NDPA frame, 01 indicates a ranging NDPA frame, 10 indicates an HE NDPA frame, and 11 indicates an EHT NDPA frame.

As illustrated in FIG. 2A, each STA Info field of VHT NDP Announcement has a 2-byte length, and each STA Info field of HE/EHT/Ranging NDP Announcement has a 4-byte length.

Figure 3A:
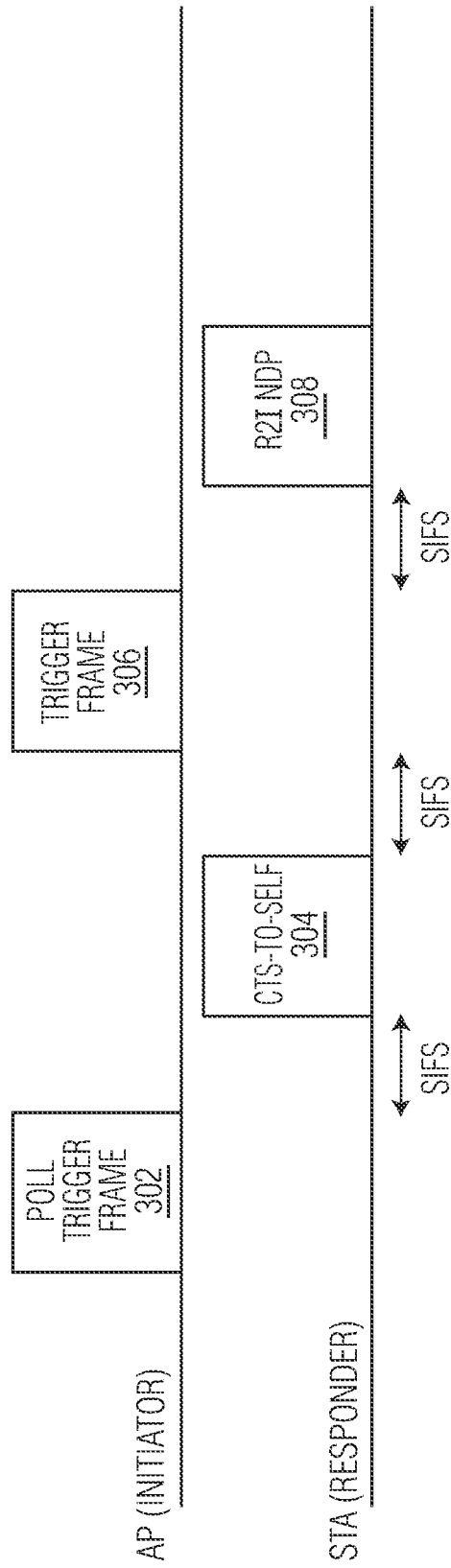
FIG. 3A illustrates a sensing frame exchange sequence when the AP is the initiator, and a STA is the responder.

Next various possible sensing frame exchange sequences will be described. When sensing is desired, one party is the initiator that initiates the sensing frame exchange and desires to know the status of the transmission channel. The other party is the responder and provides feedback to the initiator regarding the status of the communication channel. FIG. 3A illustrates a sensing frame exchange sequence when the AP is the initiator, and a STA is the responder. The AP initiates the sensing frame exchange sequence by transmitting a poll trigger frame 302. In response, the STA sends back a clear to send (CTS)-to-self frame 304. In response, the AP transmits a trigger frame 306. Then the STA responds with a responder-to-initiator (R2I) NDP that includes information that may be used to determine the state of the channel to be used for sensing. Note that each of the transmissions are separated by a Short Frame Interface (SIFS) period.

Figure 3B:
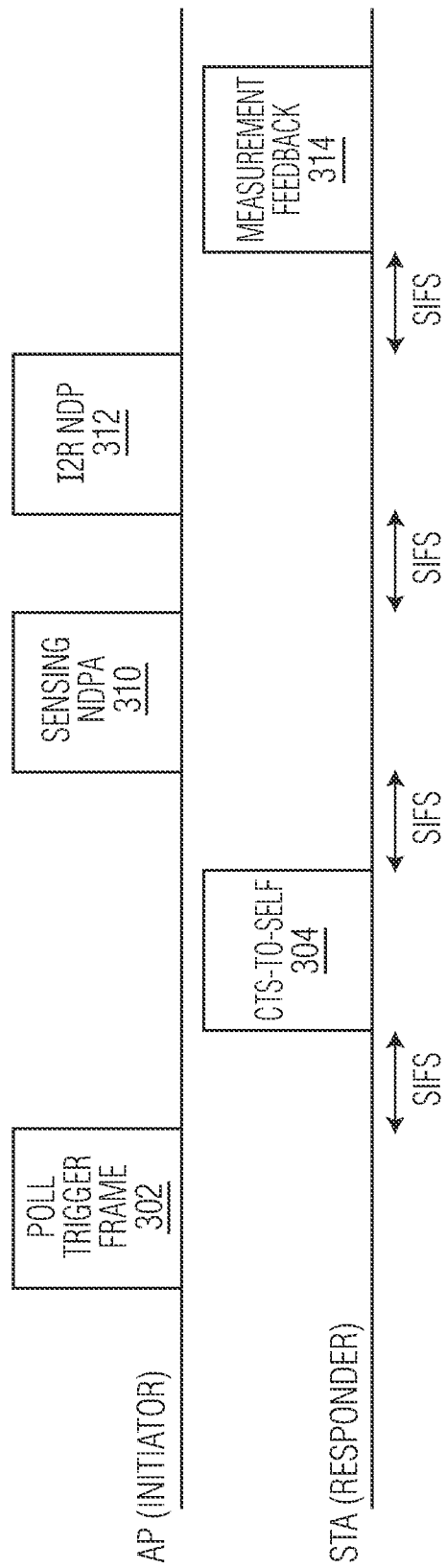
FIG. 3B illustrates another sensing frame exchange sequence when the AP is the initiator, and a STA is the responder.

FIG. 3B illustrates another sensing frame exchange sequence when the AP is the initiator, and a STA is the responder. The AP initiates the sensing frame exchange sequence by transmitting a poll trigger frame 302. In response the STA sends back a CTS-to-self frame 304. In response, the AP transmits a sensing NDPA frame 310. Then the AP transmits an initiator-to-responder (I2R) NDP 312 to the STA. Then the STA responds with a Measurement report frame 321 that includes information regarding the state of the channel to be used for sensing.

Figure 3C:
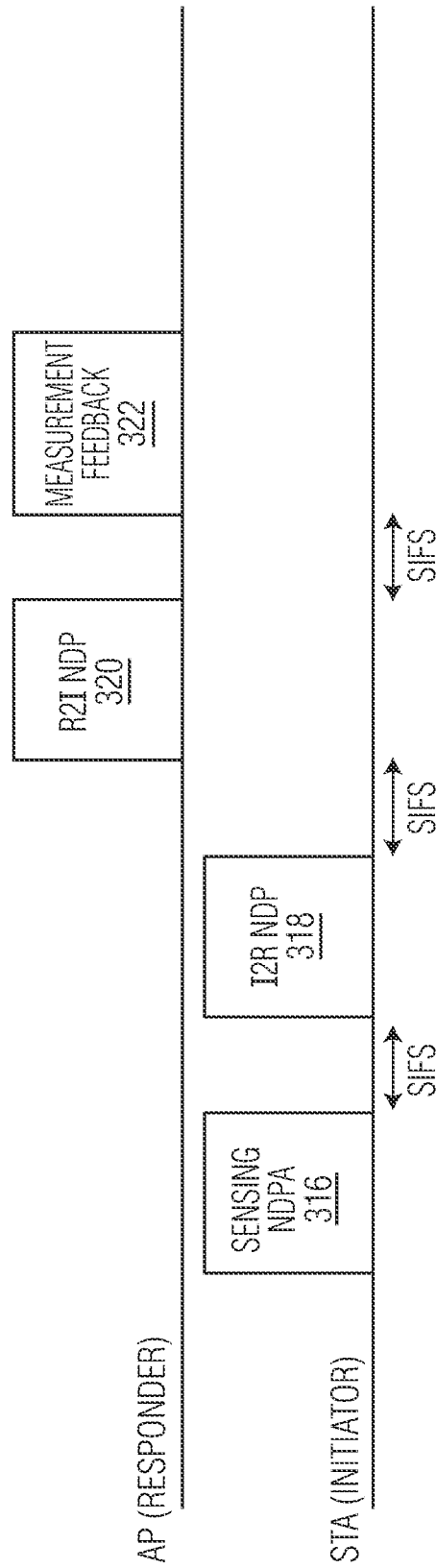
FIG. 3C illustrates a sensing frame exchange sequence when the STA is the initiator, and an AP is the responder.

FIG. 3C illustrates a sensing frame exchange sequence when the STA is the initiator, and an AP is the responder. The STA initiates the sensing frame exchange sequence by transmitting a sensing NPDA frame 316. Then the STA transmits an I2R NDP 318. In response, the AP sends back an R2I NDP 320. The AP then sends a measurement report frame 322 that includes information regarding the state of the channel to be used for sensing. Note that in FIGS. 3A-C only one responder is shown, but multiple responders may be present that each respond to the initiator.

Now various embodiments of sensing NDPA schemes will be described. In a first embodiment, a method for sensing NDPA is explicitly indicated by a STA Info field with specific AID11 and B31 values in the NDPA frame that are used to indicate that the other STA Info fields in the NDPA are used for sensing. For example, currently only values of up to 2007 are used for the AID11 field. Therefore, any value greater than 2007 may be used to indicate NDPA sensing. Alternatively, a specific value may be selected that indicates sensing NDPA. In any case, the STAs look at the AID11 fields and look for an AID11 value that indicates that a sensing NDPA frame is specified. As there may be multiple STA Info fields, the AID11 that indicates sensing NDPA should be before the STA info field(s) addressed to the STA(s) that will provide sensing information. This may be done because in many implementations, STAs listening to the NDPA will look for an AID11 related to the STA, and then the STA does not process the further AID11 values. Alternatively, the AID11 value indicating sensing NDPA may be the first AID 11 value to ensure that it is before the AID values for all of the STAs.

In a second sensing NDPA scheme embodiment, the sensing NDPA is derived from the Ranging NDP Announcement. In this sensing NDPA, the NDP Announcement Variant value 01 of Ranging NDP Announcement is reused. Further, the two reserved bits 228 and 234 (B26 and B31) of the STA Info field are used to indicate that the NPDA is a sensing NPDA and that a sensing frame exchange sequence is solicited. In this embodiment, reserved bit 228 (B26) may become a Sensing Indication 1 bit, and reserved bit 234 (B31) may become a Sensing Indication 2 bit. The specific combination of Sensing Indication bit 1 and Sensing Indication bit 2 then may be used to not only indicate sensing NDPA but may also specify a specific exchange sequence. For example, Sensing Indication 1 and Sensing Indication 2 being 00 means Ranging NDP Announcement; Sensing Indication 1 and Sensing Indication 2 being 01 means Ranging NDP Announcement for Sensing NDPA+I2R NDP+R2I feedback; and Sensing Indication 1 and Sensing Indication 2 being 02 means Ranging NDP Announcement for Sensing NDPA+I2R NDP+R2I NDP+R2I feedback. Further, for this embodiment of Sensing NDPA, the bits other than AID11, Disambiguation, Sensing Indication1/2 in STA Info field may also be redefined.

In a third sensing NDPA scheme embodiment the sensing NDPA is derived from the Ranging NDP Announcement. That is reusing the NDP Announcement Variant value 01 of Ranging NDP Announcement (See FIG. 2D). The reserved bit (B31) 234 in the STA Info field indicates the sensing frame exchange sequence is solicited. For example, the reserved bit 234 being 0 means Ranging NDP Announcement, and the reserved bit 234 being 1 means Sensing NDP Announcement. The meanings of the reserved bit 234 may be flipped as well. In this embodiment, the different non-trigger based (NTB) sensing frame exchange sequences are decided by whether the NDP Announcement is transmitted by AP or STA (or by an initiator STA (ISTA) or responder STA (RSTA)). Further, for Sensing NDP Announcement, the bits other than AID11, Disambiguation, Sensing Indication in STA Info field can be redefined.

In a fourth sensing NDPA scheme embodiment the sensing NDPA Sensing NDP Announcement and EHT NDP Announcement share the same value in NDP Announcement Variant value. That is, the NDP Announcement Variant value 11 is reused for Sensing NDP Announcement. Further, two bits of the Sounding Dialog Token Number may be used as a two bit Sensing Indication. That will leave 4 bits for the Sounding Dialog Token Number. When the Sensing Indication is 0 it means that the NDPA is an EHT NDP Announcement, and the Sounding Dialog Token may be set to 0 (reserved) for an EHT NDP Announcement. When the Sensing Indication is set to 1, sensing NDPA is indicated along with sensing exchange sequence of Sensing NDPA+I2R NDP+R2I feedback. When the Sensing Indication is set to 2, Sensing NDPA is indicated along with sensing exchange sequence of Sensing NDPA+I2R NDP+R2I NDP+R2I feedback. In an alternative embodiment, the Sensing Indication of 1 indicates a sensing NDPA, and the different NTB sensing frame exchange sequences are decided by whether the NDP Announcement is transmitted by AP or STA (or by ISTA or RSTA).

In a fifth sensing NDPA scheme embodiment the sensing NDPA is indicated by whether the ISTA's NDP or RSTA's NDP is included in sensing frame exchange sequence is carried in STA Info field explicitly, e.g., by a specific value of I2R N_STS and R2I N-STS. Specific values of I2R_STS and R2I N-STS may be selected. Then when a STA sees one of those specific values in either the I2R-STS field or the R2I N-STS field, then the STA knows that the NPDA is a sensing NPDA.

In a sixth sensing NDPA scheme embodiment implicit indication of Sensing NDPA is used. In a first option, a STA and an AP cannot negotiate an NDP ranging agreement if they have an NDP sensing agreement, and a STA and an AP cannot negotiate an NDP sensing agreement if they have an NDP ranging agreement. A ranging NDP Announcement is used in NTB NDP sensing if the STA and the AP negotiate NDP sensing agreement. In a second option, all the NDP sensing frame exchange sequences are done in negotiated transmit wait time service periods (TWT SPs). Ranging NDP Announcement is used in NTB NDP sensing within the negotiated TWT SPs.

In a seventh sensing NDPA scheme embodiment the sensing NDPA is indicated by a new subtype for Sensing NDPA. A new subtype value is used in control frame extension. Instead of using bits B11 to B8 of the Frame Control field as the Control Frame Extension for more subtype values, in the frame body of control frame with the new Subtype value, the additional subtype field is defined. One value of the additional subtype field indicates the control frame is Sensing NDPA. This method avoids the usage of reserved bits in Frame Control field of the Control frame, so the legacy STAs that receive the control frame will not be confused.

Figure 4:
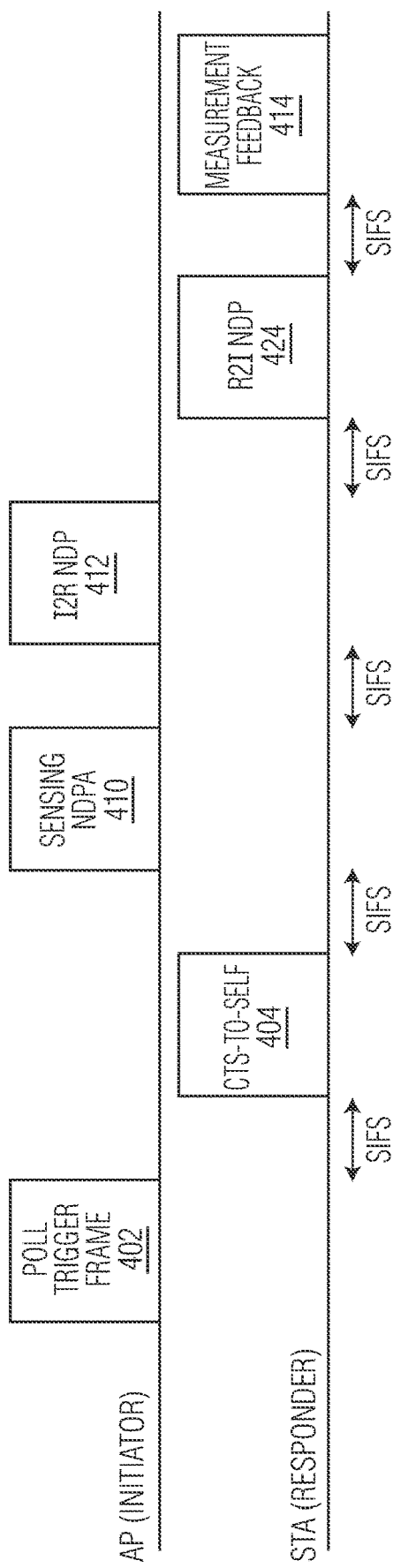
FIG. 4 illustrates a new sensing exchange sequence.

Some additional embodiments of sensing exchange sequences will now be described. FIG. 4 illustrates a new sensing exchange sequence. The sensing exchange sequence of FIG. 4 is similar to the sensing exchange sequence of FIG. 3B. The sensing exchange sequence of FIG. 4 adds an R2I NDP frame 424 between the I2R NDP frame 412 and measurement feedback frame 414. Another variation of the sensing exchange sequence may be that the Poll Trigger+CTS-to-Self frames may be replaced by RTS/CTS, Basic Trigger+QoS Null frames. Another variation of the sensing exchange sequence may be that the Poll Trigger+CTS-to-Self is optional. Another variation of the sensing exchange sequence may be that the AP initiated NTB sensing can be in a TWT SP. An enhancement could be that TWT can be negotiated with unassociated STA. The TWT SP may be replaced by the periodic SPs. In these sensing exchange sequences, the sensing NDPA may use any the embodiments described herein.

Figure 5:
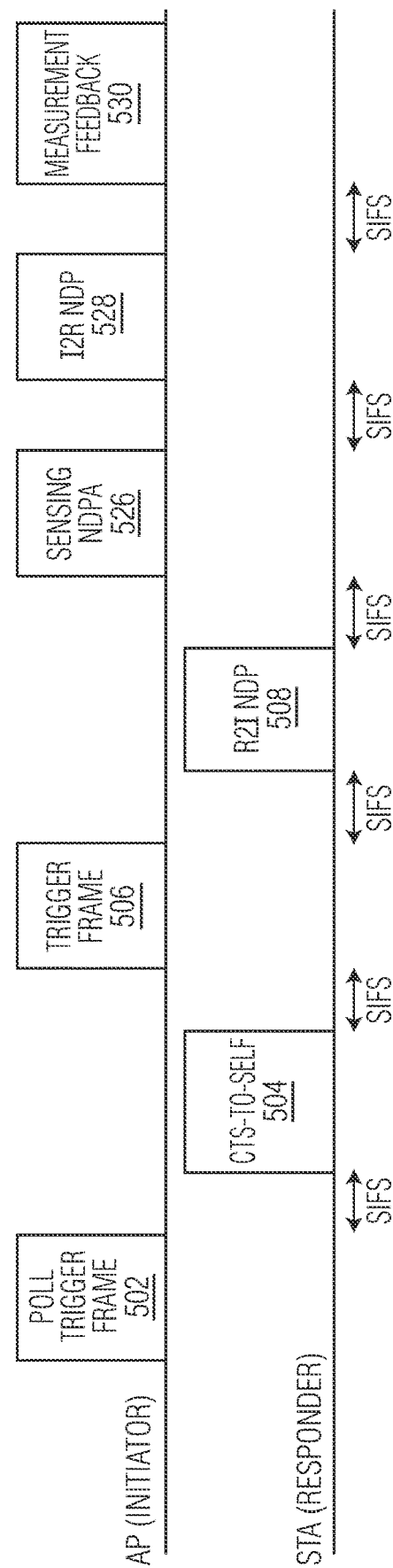
FIG. 5 illustrates a new sensing exchange sequence.

Some further additional embodiments of sensing exchange sequences will now be described. FIG. 5 illustrates a new sensing exchange sequence. The sensing exchange sequence of FIG. 5 is similar to the sensing exchange sequence of FIG. 3A. The sensing exchange sequence of FIG. 5 adds Sensing NPDA 526, I2R NDP 528, and Measurement Feedback 530 frames after the R2I NDP 508. Another variation of the sensing exchange sequence may be that the Poll Trigger+CTS-to-Self frames are optional. Another variation of the sensing exchange sequence may be that the TB sensing can be in a TWT SP. An enhancement could be that TWT can be negotiated with unassociated STA. Another variation of the sensing exchange sequence may be that the SPs for TB ranging may be used for TB sensing.

TB sensing of the transmission channel may be implemented with immediate feedback or delayed feedback. In immediate feedback, the measurement feedback is sent back before another request to measure the channel is sent. In delayed feedback, the measurement feedback may be delayed until after another measurement request has been made. For example, this may occur with the processing required to provide the measurement feedback cannot be completed before the next measurement request is ready to be requested. Such delayed feedback may also be specified as mandatory. When delayed feedback is mandatory, the NDP for sensing has same format as the ranging NDP. The mandatory support of the sensing feedback is delayed feedback. Further, it could be that during the negotiation, the initiating device may indicate the soliciting of the dummy feedback (feedback without valid information).

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A first wireless device configured to establish sensing with a second wireless device, comprising:
a transmitter configured to:
transmit a null data packet announcement (NDPA) frame to the second wireless device configured to include an indication that the NDPA frame is a sensing NDPA frame; and
transmit a null data packet (NDP) frame to the second wireless device; and
a receiver configured to:
receive a frame from the second wireless device containing sensing measurement results, wherein a first reserved field and a second reserved field of a STA Info field of the NDPA frame indicates frame exchange sequence to be used between the first wireless device and the second wireless device.

2. The first wireless device of claim 1, wherein the NDPA frame indicates that it is a sensing NDPA frame based upon a STA Info field of the NDPA frame.

3. The first wireless device of claim 1, wherein the NDPA frame indicates that it is a sensing NDPA frame based upon AID11 and Sensing subfields in a STA Info field of the NDPA frame.

4. The first wireless device of claim 3, wherein the AID11 subfield having a specified value and the Sensing subfield being set to a predetermined value indicate that the NDPA frame is a sensing NDPA frame.

5. The first wireless device of claim 3, wherein the frame received from the second wireless device is a measurement report frame.

6. The first wireless device of claim 3, wherein the frame received from the second wireless device is a sensing responder to the NDP frame sent by a sensing initiator.

7. The first wireless device of claim 1, wherein the NDPA frame indicates that it is a ranging NDPA frame or a sensing NDPA frame based upon an NDPA variant subfield of a sounding dialog token field of the NDPA frame.

8. The first wireless device of claim 7, wherein the NDPA variant subfield has a value of 01.

9. A method of sensing measurement exchange between a first wireless device and a second wireless device, comprising:
transmitting, by the first wireless device, a null data packet announcement (NDPA) frame to the second wireless device configured to include an indication that the NDPA frame is a sensing NDPA frame;
transmitting, by the first wireless device, a null data packet (NDP) frame to the second wireless device; and
receiving, by the first wireless device, a frame from the second wireless device containing sensing measurement results, wherein a first reserved field and a second reserved field of a STA Info field of the NDPA frame indicates frame exchange sequence to be used between the first wireless device and the second wireless device.

10. The method of claim 9, wherein the NDPA frame indicates that it is a sensing NDPA frame based upon a STA Info field of the NDPA frame.

11. The method of claim 10, wherein the NDPA frame indicates that it is a ranging NDPA frame or a sensing NDPA frame based upon an NDPA variant subfield of a sounding dialog token field of the NDPA frame.

12. The method of claim 11, wherein a NDPA variant field has a value of 01.

13. The method of claim 9, wherein the NDPA frame indicates that it is a sensing NDPA frame based upon an AID11 subfield and a Sensing subfield in a STA Info field of the NDPA frame.

14. The method of claim 13, wherein the AID11 subfield having a specified value and the Sensing subfield being set to a predetermined value indicates that the NDPA frame is a sensing NDPA frame.

15. The method of claim 14, wherein the frame received from the second wireless device is a measurement report frame.

16. The method of claim 14, wherein the frame received from the second wireless device is a responder to initiator NDP frame.

* * * * *